(12) United States Patent
Jeong (10) Patent No.: US 10,816,246 B2
(45) Date of Patent: Oct. 27, 2020

(54) EXPANSION VALVE USING SHAPE MEMORY ALLOY SPRING AND AIR CONDITIONER SYSTEM FOR VEHICLE USING THE SAME

(71) Applicants: HYUNDAI MOTOR COMPANY, Seoul (KR); KIA MOTORS CORPORATION, Seoul (KR)

(72) Inventor: Seong-Bin Jeong, Hwaseong-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 103 days.

(21) Appl. No.: 16/204,686

(22) Filed: Nov. 29, 2018

(65) Prior Publication Data

US 2020/0033034 A1    Jan. 30, 2020

(30) Foreign Application Priority Data

Jul. 30, 2018   (KR) .................. 10-2018-0088715

(51) Int. Cl.
*F25B 41/06* (2006.01)
*F16K 31/00* (2006.01)
*B60H 1/32* (2006.01)
*B60H 1/00* (2006.01)

(52) U.S. Cl.
CPC ....... *F25B 41/062* (2013.01); *B60H 1/00485* (2013.01); *B60H 1/3204* (2013.01); *F16K 31/002* (2013.01); *B60H 2001/3267* (2013.01); *B60H 2001/3285* (2013.01)

(58) Field of Classification Search
CPC ............ F25B 41/062; F25B 2341/0683; F25B 2341/0681; F16D 31/002; F16D 99/0038; B60H 1/00485
See application file for complete search history.

(56) References Cited

U.S. PATENT DOCUMENTS

| 3,835,659 A * | 9/1974 | McBride, Jr. ......... F16K 31/025 62/202 |
| 2007/0295016 A1 | 12/2007 | Robin |
| 2008/0127664 A1 | 6/2008 | Aguilar et al. |

FOREIGN PATENT DOCUMENTS

| CN | 100565046 C | 12/2009 |
| JP | H02-076987 A | 3/1990 |
| JP | 2000-241048 A | 9/2000 |
| JP | 2007-024486 A | 2/2007 |

(Continued)

OTHER PUBLICATIONS

English Translation of JP 2007033021 Hirota et. al. (Year: 2020).*

*Primary Examiner* — Cassey D Bauer
(74) *Attorney, Agent, or Firm* — Morgan, Lewis & Bockius LLP (57) ABSTRACT

An expansion valve using a shape memory alloy spring includes: a valve housing having a first refrigerant flow passage and a second refrigerant flow passage passing through both sides of the valve housing and an opening/closing adjuster receiving space along an opened upper portion of the valve housing; an opening/closing adjuster configured to enter the opening/closing adjuster receiving space and to adjust an opening/closing degree of a valve using a shape memory alloy spring exerting an elastic force at a memory temperature; and a valve cover sealing the opened upper portion of the valve housing.

16 Claims, 7 Drawing Sheets

(56) References Cited

FOREIGN PATENT DOCUMENTS

| | | | | | |
|---|---|---|---|---|---|
| JP | 2007033021 | * | 2/2007 | ...... | F25B 2341/0683 |
| JP | 2009-250590 A | | 10/2009 | | |
| KR | 10-2011-0125325 A | | 11/2011 | | |

* cited by examiner

FIG. 1

-- PRIOR ART --

EXPANSION VALVE USING SHAPE MEMORY ALLOY SPRING AND AIR CONDITIONER SYSTEM FOR VEHICLE USING THE SAME

CROSS-REFERENCE(S) TO RELATED APPLICATIONS

This application claims priority to Korean Patent Application No. 10-2018-0088715, filed on Jul. 30, 2018, which is incorporated herein by reference in its entirety.

TECHNICAL FIELD

The present disclosure relates to an expansion valve using a shape memory alloy spring and an air conditioner system for a vehicle using the same, and more particularly, to an expansion valve employing a shape memory alloy spring exerting an elastic force at a memory temperature to adjust an opening/closing degree thereof, and an air conditioner system for a vehicle using the same.

BACKGROUND

An air conditioning system for controlling an indoor temperature of a vehicle is largely composed of an air conditioner system and a heater system. The air conditioner system is configured to circulate cold air generated by latent heat of evaporation of refrigerant to an indoor to control a temperature.

Figure 1:
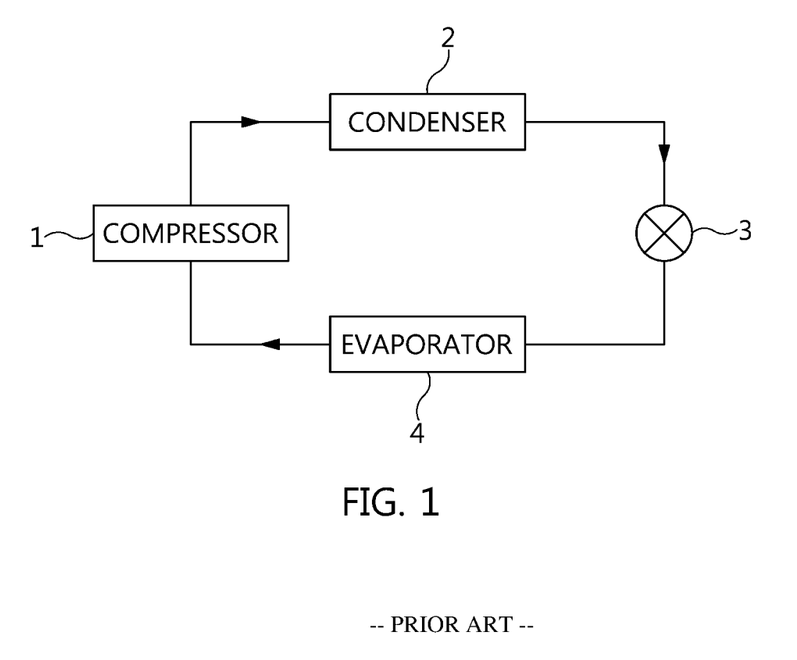
FIG. 1 is a view showing an air conditioner system for a vehicle.

An air conditioner system for a vehicle uses a vapor compression refrigeration cycle, and mainly includes, as shown in FIG. 1, a compressor 1 configured to compress and deliver refrigerant, a condenser 2 configured to condense the high-pressure refrigerant delivered from the compressor 1, an expansion valve 3 configured to throttle the refrigerant condensed and liquefied in the condenser 2, and an evaporator 4 configured to heat-exchange the low-pressure liquid-phased refrigerant, which is throttled by the expansion valve 3, with air blown to an indoor side of a vehicle and evaporate, thereby cooling air discharged to the indoor using endothermic operation caused by latent heat of vaporization of the refrigerant. Here, the compressor 1, the condenser 2, the expansion valve 3 and the evaporator 4 are connected to each other via a refrigerant line (refrigerant pipe). As described above, the air conditioner system for the vehicle cools the indoor of the vehicle through a refrigerant circulating process. FIG. 1 is a view showing the air conditioner system for a vehicle.

Here, the expansion valve 3 senses a refrigerant pressure and a refrigerant temperature of the evaporator 4 to maintain a constant super heat degree, thereby adjusting a flow rate of the refrigerant. As above, an operation mechanism of the expansion valve 3 is operated in a temperature-sensitive and pressure-sensitive method in which all the temperature and the pressure of the evaporator 4 are sensed to determine a final opening/closing.

Here, the expansion valve 3 is composed of a diaphragm, a spring, a control rod, a ball type valve, and the like, and the final opening/closing is determined by a force equilibrium state among a pressure of active gas contained in the diaphragm, a pressure of a low-pressure side and a restoring force of the spring. Here, a pressure Pb of active gas contained in the diaphragm is formed by sensing a temperature Te of the low-pressure side. At this time, Pb=f(Te) is satisfied.

However, the conventional expansion valve 3 has the disadvantages that since it is composed of a diaphragm, a spring, a control rod, a ball valve, etc., a structure thereof is complicated and the expansion valve is expensive since it is manufactured with high precision.

In the conventional expansion valve 3, in addition, due to an orthogonal structure of a flow of the refrigerant (suction) discharged from the evaporator and the control rod, and a lengthy configuration of the control rod, a vibration caused by the refrigerant flow can be transmitted well to the diaphragm well through the control rod. Moreover, since the control rod is formed in the form of a thin shaft, a fine vibration cannot be prevented. Therefore, the fine vibration of the control rod inevitably generates noise in the diaphragm.

In addition, due to an extreme change of the refrigerant flow passage in the valve, the expansion valve 3 may generate refrigerant flow noise due to severe change in the refrigerant flow passage in the valve.

In particular, since the properties and characteristics of active gas contained in the diaphragm have been not made public, the existing expansion valve 3 can be manufactured only by some companies, so that there is need to provide a way by which the expansion valve can be substituted.

For the existing expansion valve 3, accordingly, there is a need to provide a measure capable of inexpensively manufacturing an expansion valve to reduce a unit cost and of improving noise generating factors caused by a complicated structure of an expansion valve.

The contents described in Background are to help the understanding of the background of the present disclosure, and may include what is not previously known to those skilled in the art to which the present disclosure pertains.

SUMMARY OF THE DISCLOSURE

An object of the present disclosure is to provide an expansion valve employing a shape memory alloy spring exerting an elastic force at a memory temperature to adjust an opening/closing degree thereof, thereby sensing a refrigerant pressure and a refrigerant temperature of an evaporator (low pressure side) to maintain a constant super heat degree, and an air conditioner system for a vehicle using the same.

An expansion valve using the shape memory alloy spring according to an exemplary embodiment of the present disclosure may include: a valve housing having a first refrigerant flow passage and a second refrigerant flow passage passing through both sides of the valve housing and an opening/closing adjuster receiving space along an opened upper portion of the valve housing; an opening/closing adjuster configured to enter the opening/closing adjuster receiving space and to adjust an opening/closing degree of a valve using a shape memory alloy spring exerting an elastic force at a memory temperature; and a valve cover sealing the opened upper portion of the valve housing.

The opening/closing adjuster may be configured to sense a refrigerant pressure and a refrigerant temperature of the first refrigerant flow passage to adjust an opening/closing of an orifice hole of the second refrigerant flow passage.

The opening/closing adjuster may include: a lift shaft in which a disc-shaped upper plate and a control bar erected vertically and downwardly at a center of the upper plate are integrally formed, the lift shaft being vertically moved to adjust a size of the orifice hole of the second refrigerant flow passage; an upper spring placed above the upper plate; and a lower spring configured to be inserted into the control bar to be placed below the upper plate.

The upper spring may be formed by overlapping a plurality of springs having the same central axis and different diameters, and the plurality of springs may include at least one shape memory alloy spring designed to have a different memory temperature.

The upper spring may be disposed between the valve cover and an upper face of the upper plate.

The opening/closing adjuster may be disposed above the first refrigerant flow passage, and a spring force of the upper spring and the sum of a spring force of the lower spring and the refrigerant pressure may be maintained in a force equilibrium state.

The upper spring may be placed in the opening/closing adjuster receiving space, and the lower spring may be placed in the first refrigerant flow passage.

The opening/closing adjuster may be formed below the first refrigerant flow passage, and a spring force of the lower spring and the sum of a spring force of the upper spring and the refrigerant pressure may be maintained in a force equilibrium state.

The upper spring may be placed in the first refrigerant flow passage and the lower spring may be placed in the opening/closing adjuster receiving space.

An air conditioner system for a vehicle according another exemplary embodiment of the present disclosure may include: a compressor configured to compress and deliver a refrigerant; a condenser configured to condense and liquefy the compressed refrigerant delivered from the compressor; an expansion valve configured to throttle the refrigerant condensed and liquefied by the condenser; and an evaporator configured to heat-exchange the refrigerant, which is throttled by the expansion valve, with air blown to an indoor side of a vehicle and evaporate, so that the air discharged to the indoor of the vehicle is cooled by latent heat of vaporization of the refrigerant, wherein the expansion valve may include: a valve housing having a first refrigerant flow passage and a second refrigerant flow passage passing through both sides of the valve housing and an opening/closing adjuster receiving space along an opened upper portion of the valve housing; an opening/closing adjuster configured to enter the opening/closing adjuster receiving space and to adjust an opening/closing degree of a valve using a shape memory alloy spring exerting an elastic force at a memory temperature; and a valve cover sealing the opened upper portion of the valve housing.

An inlet port of the first refrigerant flow passage may be connected to an outlet port of the evaporator, an outlet port of the first refrigerant flow passage may be connected to an inlet port of the compressor, an inlet port of the second refrigerant flow passage may be connected to an outlet port of the condenser, and an outlet port of the second refrigerant flow passage may be connected to an inlet port of the evaporator.

The present disclosure adjusts an opening/closing of the expansion valve using the shape memory alloy spring which exerts an elastic force at a memory temperature, so that it is possible to sense the refrigerant pressure and the refrigerant temperature of an evaporator (low pressure) to maintain a constant super heat degree.

The present disclosure can be manufactured at a low cost because it can reduce the number of parts and reduce the cost (including the manufacturing process cost) and reduce a weight.

In addition, since it is possible to adjust the memory temperature of the shape memory alloy and the spring constant and to apply them, so that the present disclosure can expect the advantage of the valve design and cost reduction.

Further, in the present disclosure, it is possible to prevent the lift shaft from being vibrated without adding any additional parts by a structural improvement of the lift shaft.

Furthermore, the present disclosure can be manufactured to have a smooth structure in which occurrence of turbulence in the refrigerant flow passage is minimized.

DESCRIPTION OF SPECIFIC EMBODIMENTS

Hereinafter, preferred embodiments of the present disclosure will be described in detail with reference to the accompanying drawings. However, in the following description and the accompanying drawings, a detailed description of well-known functions or configurations that can obscure the subject of the present disclosure will be omitted. In addition, it should be noted that the same components are denoted by the same reference numerals as much as possible throughout the entire drawings.

It should be understood that the terms or the words used in the specification and claims hereinafter described should not be construed as limited to general or dictionary meanings, but interpreted based on the meanings and concepts corresponding to technical aspects of the present disclosure on the basis of the principle that the inventor is allowed to define terms appropriately for the best explanation.

Accordingly, the embodiments described in the present specification and the configurations illustrated in the drawings are merely the most preferred one embodiment of the present disclosure, and not intended to represent all of the technical spirits of the present disclosure. Therefore, it should be understood that various equivalents and modifications can be substituted for those at the time of filing the present application.

Some elements are exaggerated, omitted, or schematically illustrated in the accompanying drawings, and actual sizes of respective elements are not necessarily represented in the drawings. The present disclosure is not limited by relative sizes or distances illustrated in the accompanying drawings.

In the entire specification, when a certain portion "includes" a certain component, this means that the other components are excluded, but may be further included unless specially described otherwise. In addition, when a certain portion is "connected" to another portion, it can be "directly connected" or "electrically connected" to other elements interposed therebetween.

The singular forms include the plural forms unless the context clearly indicates otherwise. It should be understood that the terms "comprises", "has" and the like specify the presence of features, integers, steps, operations, elements, components, or a combination thereof described in this specification, but do not preclude in advance the presence or addition of one or more other features, integers, steps, operations, elements, components, or a combination thereof.

In addition, the term "~unit" as used in the specification means a software or hardware component, such as FPGA or ASIC, which performs certain tasks. However, "~unit" does not mean to be limited to software or hardware. The term "~unit" may be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units".

In below, embodiments of the present disclosure are described in detail with reference to the accompanying drawings so as to enable those skilled in the art to which the present disclosure pertains to easily implement the present disclosure. However, the present disclosure may be embodied in many different forms and should not be limited to the embodiments set forth herein. In order to clearly illustrate the present disclosure, furthermore, parts which does not relate to the description are omitted, and like parts are denoted by like reference numerals throughout the specification.

Hereinafter, preferred embodiments of the present disclosure are described with reference to the accompanying drawings.

Figure 2:
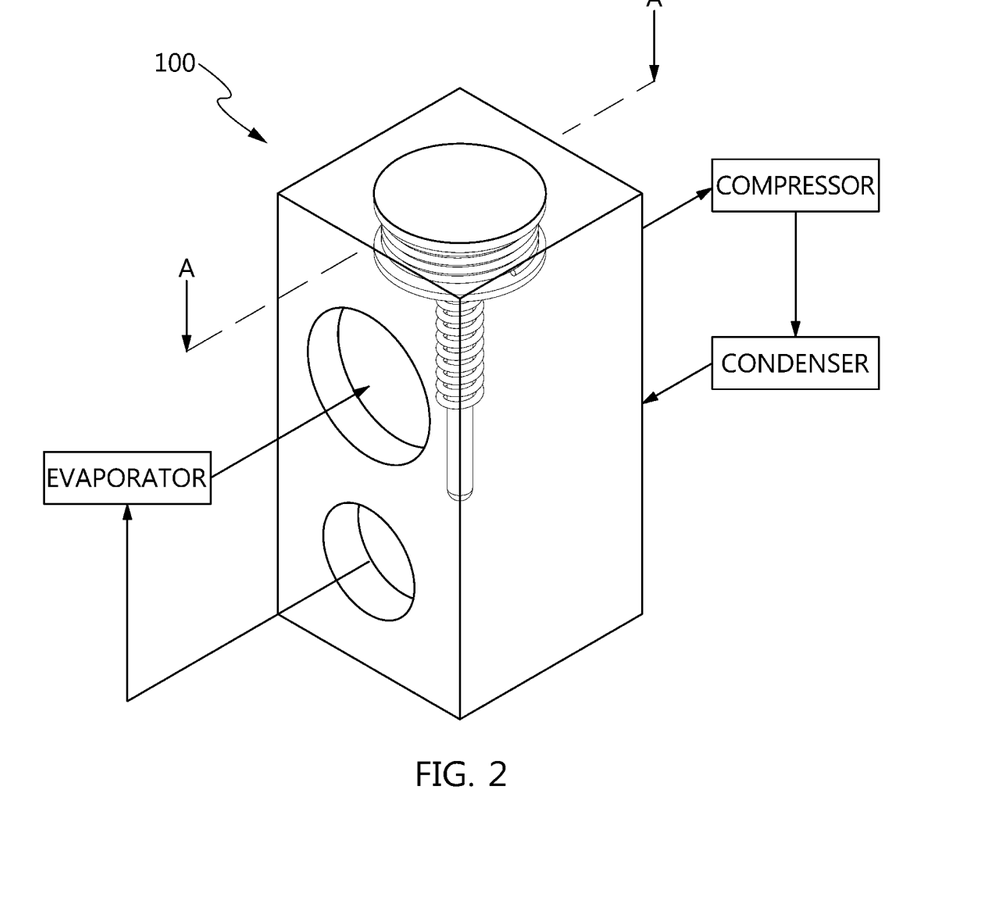
FIG. 2 is a perspective view of an expansion valve using a shape memory alloy spring, according to one embodiment of the present disclosure.
Figure 3:
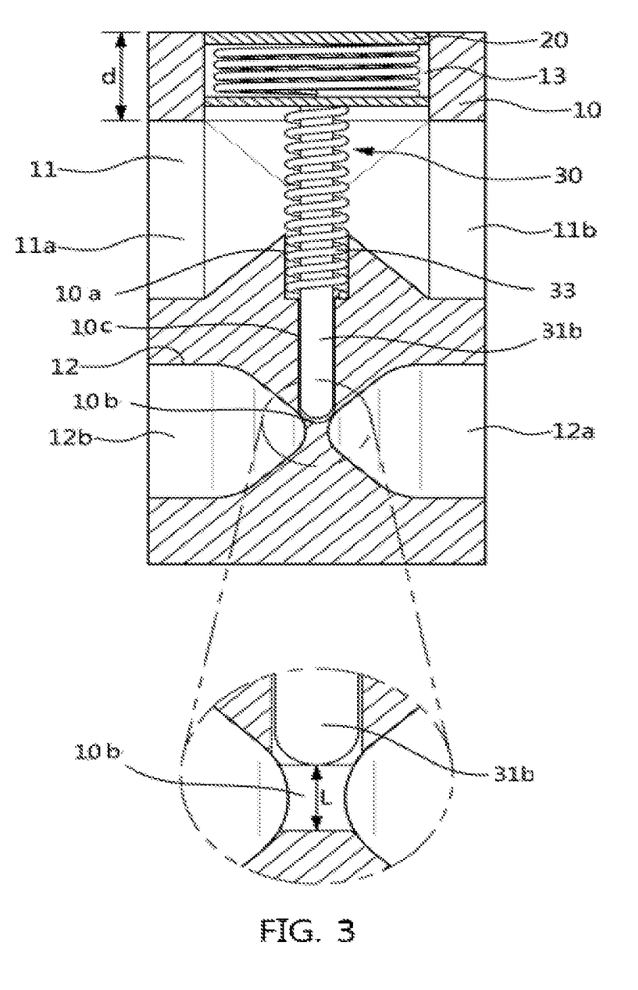
FIG. 3 is a cross-sectional view taken along line A-A' in FIG. 2 showing the expansion valve.
Figure 4:
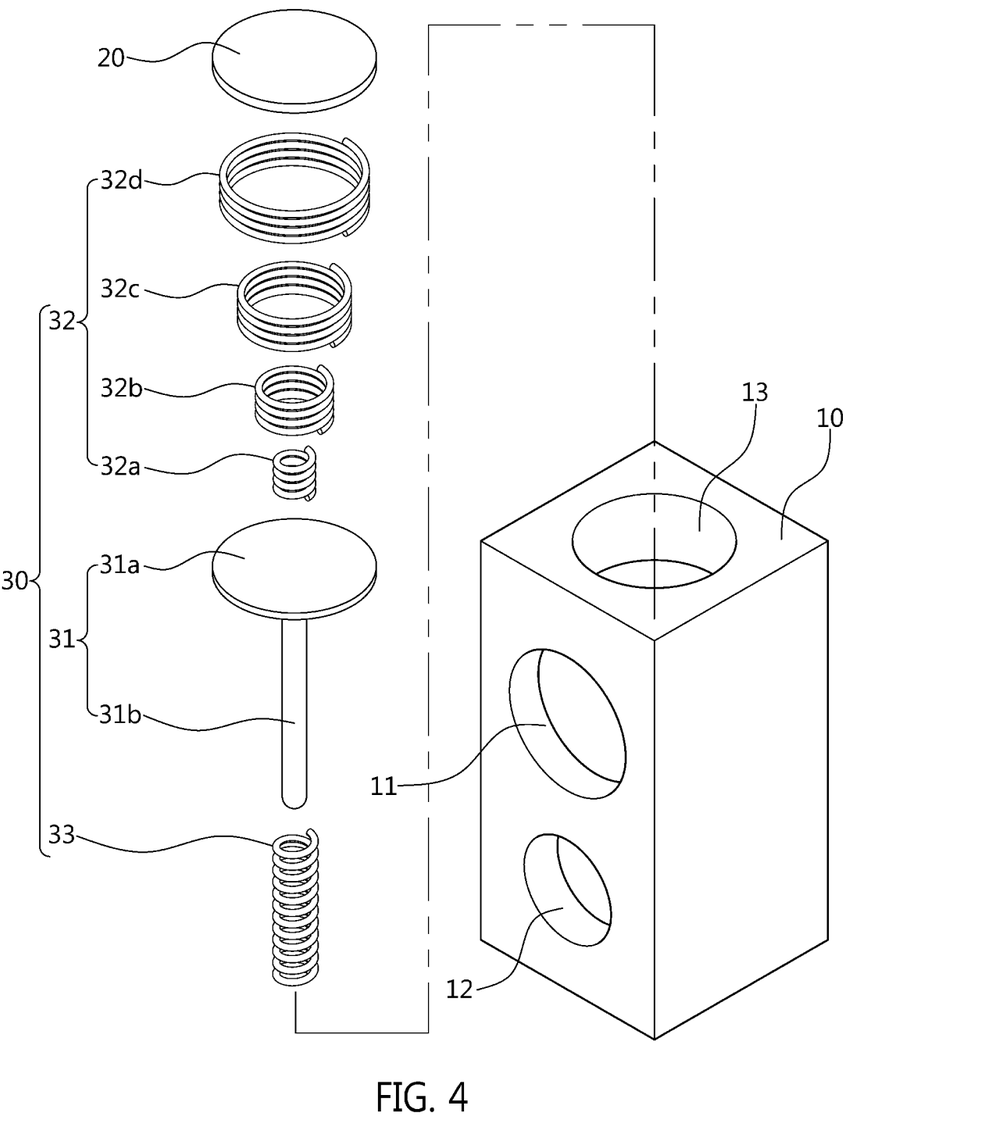
FIG. 4 is an exploded view of the expansion valve shown in FIG. 2.

FIG. 2 is a perspective view of an expansion valve using a shape memory alloy spring, according to one embodiment of the present disclosure, FIG. 3 is a cross-sectional view taken along line A-A' in FIG. 2 showing the expansion valve, and FIG. 4 is an exploded view of the expansion valve shown in FIG. 2.

As illustrated in FIGS. 2 to 4, an expansion valve 100 using a shape memory alloy spring (hereinafter, referred to as "expansion valve") according to one embodiment of the present disclosure is a thermo-sensitive and pressure-sensitive type structure which senses a refrigerant pressure and a refrigerant temperature of an evaporator (low pressure side) to adjust an opening/closing degree of the valve (that is, the lift amount or a flow rate of refrigerant) for maintaining a constant super heat degree, and employs a spring (that is, a shape memory alloy spring) formed of a shape memory alloy, which exerts an elastic force at a memory temperature, to adjust an opening/closing degree of the valve.

Such an expansion valve 100 includes a valve housing 10, a valve cover 20, and an opening/closing adjuster 30.

First, the valve housing 10 has a first refrigerant flow passage 11 and a second refrigerant flow passage 12 formed therein and passing through both sides thereof. Here, the first refrigerant flow passage 11 is formed at an upper portion of the side, and the second refrigerant flow passage 12 is formed at a lower portion of the side.

As shown in FIG. 3, in addition, each of the first refrigerant flow passage 11 and the second refrigerant flow passage 12 has a bilateral symmetrical structure, and is formed in the form of a venturi tube having an orifice hole. Orifice holes of the first refrigerant flow passage 11 and the second refrigerant flow passage 12 are in communication with each other so that a control bar 31b of the opening/closing adjuster 30, which will be described later, may be vertically moved.

In addition, the valve housing 10 has an opening/closing adjuster receiving space 13 having a cylinder shape and formed therein along an opened upper portion of the valve housing. The opening/closing adjuster 30 may be inserted into and received in this opening/closing adjuster receiving space.

Here, the opening/closing adjuster receiving space 13 is formed along the opened upper portion of the valve housing 10, and is formed above the first refrigerant flow passage 11. In this case, the opening/closing adjuster receiving space 13 has a sectional area becomes narrow below an upper plate 31a of the opening/closing adjuster 30 which will be described later.

In addition, after the opening/closing adjuster 30 is received in the opening/closing adjuster receiving space 13, the upper portion of the valve housing 10 is sealed by the valve cover 20. Here, the valve cover 20 may be fastened to an inner face of the valve housing 10 through fit-coupling or screw-coupling method. Here, the valve cover 20 may be made of any one of Teflon, stainless steel (SUS), and aluminum (Al).

Furthermore, an O-ring may be inserted into a coupling site between the valve cover 20 and the valve housing 10 to prevent the refrigerant from being leaked.

Referring to FIG. 3, a depth of space for receiving an upper spring 32 in the opening/closing adjuster receiving space 13, that is, the depth d of the opening/closing adjuster receiving space 13 forms a range of vertical movement of a lift shaft 31.

In addition, since the range of vertical movement of the lift shaft 31 is the same as that of the control bar 31b which is one of structural elements constituting the lift shaft 31, the range of vertical movement of the lift shaft 31 should be determined in consideration of the vertical movement of the control bar 31b which opens and closes a size L of the orifice hole of the second refrigerant flow passage 12.

Here, the upper plate 31a of the lift shaft 31 can be moved only within a range corresponding to the depth d of the opening/closing member adjusting space 13 by a shape of the opening/closing member adjusting space 13, and cannot be moved beyond this range.

A first inlet port 11a and a first outlet port 11b of the first refrigerant flow passage 11 are formed on the both sides of the valve housing 10, respectively. The first inlet port 11a is connected to an outlet port of the evaporator, and the first outlet port 11b is connected to an inlet port of the compressor (see FIG. 7 which will be described later).

Similarly, a second inlet port 12a and a second outlet port 12b of the second refrigerant flow passage 12 are formed on the both sides of the valve housing 10, respectively. The second inlet port 12a is connected to an outlet port of the condenser, and the second outlet port 12b is connected to an inlet port of the evaporator (see FIG. 7 which will be described later).

Here, although, for convenience of explanation, a left side of the first refrigerant flow passage 11 is referred to as the first inlet port 11a, a right side thereof is referred to as the first outlet port 11b, and a left side of the second refrigerant flow passage 12 is referred to as the second outlet 12b port, a right side thereof is referred to as the second inlet port 12a, since the first refrigerant flow passage 11 and the second refrigerant flow passage 12 are bilateral symmetrical, an opposite configuration is also possible.

However, in the case in which the evaporator is connected to the expansion valve 100, it is possible to connect the evaporator in any direction without considering a side direction of the valve housing 10. Accordingly, it is easy to mount the evaporator in the air conditioner system for a vehicle.

In addition, the valve housing 10 may be made of a metal material such as aluminum (Al) to have an integrated body. That is, since the first refrigerant flow passage 11 or the second refrigerant flow passage 12 may have a linear shape in an upper portion or a lower portion of the valve housing 10 without being bent, the flow passage can be formed integrally with the valve housing through a drilling process performed in in both directions.

In other words, since it is not necessary to form a curve-shaped refrigerant flow passage in the valve housing 10, there is no need to a process in which separated housing modules are integrally assembled after individually forming the separated housing modules. Thus, the valve housing 10 may be formed using a simple process at a low cost.

Next, the opening/closing adjuster 30 includes the lift shaft 31, the upper spring 32, and a lower spring 33.

This opening/closing adjuster 30 senses the refrigerant pressure and the refrigerant temperature of the evaporator, that is, of the first refrigerant flow passage 11 which will be described later, to adjust an opening/closing degree of the valve, that is, an opening/closing of the orifice hole of the second refrigerant flow passage 12 which will be described later.

In other words, using the characteristic that as the refrigerant pressure and the refrigerant temperature of the evaporator is changed, a force equilibrium state between an upper side and a lower side of the lift shaft 31 is changed, the opening/closing adjuster 30 adjusts an opening/closing degree of the valve through a vertical movement of the lift shaft 31.

In the opening/closing adjuster 30, to this end, with respect to the lift shaft 31, the upper spring 32 is positioned at an upper side and the lower spring 33 is positioned at a lower side.

Referring to FIG. 4, the lift shaft 31 includes the disc-shaped upper plate 31a and the control bar 31b vertically erected at a center of the upper plate 31a, and the upper plate is formed integrally with the control bar. The lift shaft 31 does not adopt a structure in which a shaft and a pin cover are separately manufactured and connected to each other.

A side face of the upper plate 31a is in close contact with an inner face of the opening/closing member receiving space 13, and the control bar 31b is inserted into and passes through the orifice hole of the first refrigerant flow passage 11 and the orifice hole of the second refrigerant flow passage 12 of the valve housing 10, which are formed in a straight line. This is a structure for preventing the lift shaft 31 from being vibrated, and there is no need to provide a separate structure such as a pin cover or the like which is necessary for preventing the shaft from being vibrated.

Further, the control bar 31b directly opens and closes the orifice hole of the second refrigerant flow passage 12. Due to the above, there is no need to provide the lift shaft 31 with a separate structure (ball) for opening/closing the orifice hole of the second refrigerant flow passage 12, and the second refrigerant flow passage 12 may be formed in a straight line-shape to be formed as a smooth flow passage which can minimize occurrence of turbulence (friction resistance) therein.

In addition, a plurality of springs having the same central axis and different diameters are overlapped to from the upper spring 32.

Referring to FIG. 4, the upper spring 32 includes a typical spring and shape memory alloy springs. That is, the upper spring 32 includes a typical spring 32a, a first shape memory alloy spring 32b, a second shape memory alloy spring 32c, a third shape memory alloy spring 32d which are disposed from an inner side in order of small diameter.

Here, the first shape memory alloy spring 32b, the second shape memory alloy spring 32c, and the third shape memory alloy spring 32d are designed to have different memory temperatures at which an elastic force is exerted. For example, when a memory temperature of the first shape memory alloy spring 32b is Ta, a memory temperature of the second shape memory alloy spring 32c is Tb, and a memory temperature of the third shape memory alloy spring 32d is Tc, the shape memory alloy springs may be designed in a relation of Ta<Tb<Tc.

This upper spring 32 is disposed between the valve cover 20 and the upper plate 31a of the lift shaft 31. In other words, since the valve cover 20 is fixed to the upper spring 32, the upper spring 32 is supported by the valve cover 20 and exerts an elastic force on the upper plate 31a of the lift shaft 31, so that the upper spring 32 and the lower spring 33 are maintained in a force equilibrium state. Like this, the upper spring 32 functions to move the lift shaft 31 downward.

Here, at least one of a lower face of the valve cover 20 and an upper face of the upper plate 31a may be provided with a fixing part (not shown) formed thereon in the form of a groove or a hook for fixing the upper plate 32 and maintaining an aligning state.

The lower spring 33 is provided with one or more typical springs inserted into the control bar 31b of the lift shaft 31.

Such the lower spring 33 is disposed between the upper plate 31a of the lift shaft 31 and the valve housing 10. That is, since the valve housing 20 is fixed to the lower spring 33, the lower spring 33 is supported by the valve housing 20 and exerts an elastic force on the lower face of the upper plate 31a, so that the upper spring 32 and the lower spring 33 are maintained in a force equilibrium state. Like this, the lower spring 33 functions to move the lift shaft 31 upward.

As described above, the opening/closing adjuster 30 provides a configuration providing a force equilibrium state (that is, an equation of equilibrium of force) between the upper spring 32 and the lower spring 32 with respect to the lift shaft 31.

Then, the opening/closing adjuster 30 provides a configuration which senses the refrigerant temperature (temperature at an outlet portion of the evaporator and an inlet portion of the compressor) with respect to a preset memory temperature in each of the one or more shape memory alloy springs and generates an elastic force to adjust the lift amount of the second refrigerant flow passage 12.

Further, the opening/closing adjuster 30 provides a configuration which mechanically senses a low pressure Pe on an area A of the upper plate 31a of the lift shaft 31 to adjust the lift amount of the second refrigerant flow passage 12.

The opening and closing adjuster 30 provides a structure for adjusting the lift amount of the second refrigerant flow passage 12 in accordance with the movement of the lift shaft 31 in the vertical direction by using the elastic force of the elastic spring. As described above, the opening/closing adjuster 30 has a configuration which does not employ active gas contained in a diaphragm.

Figure 5:
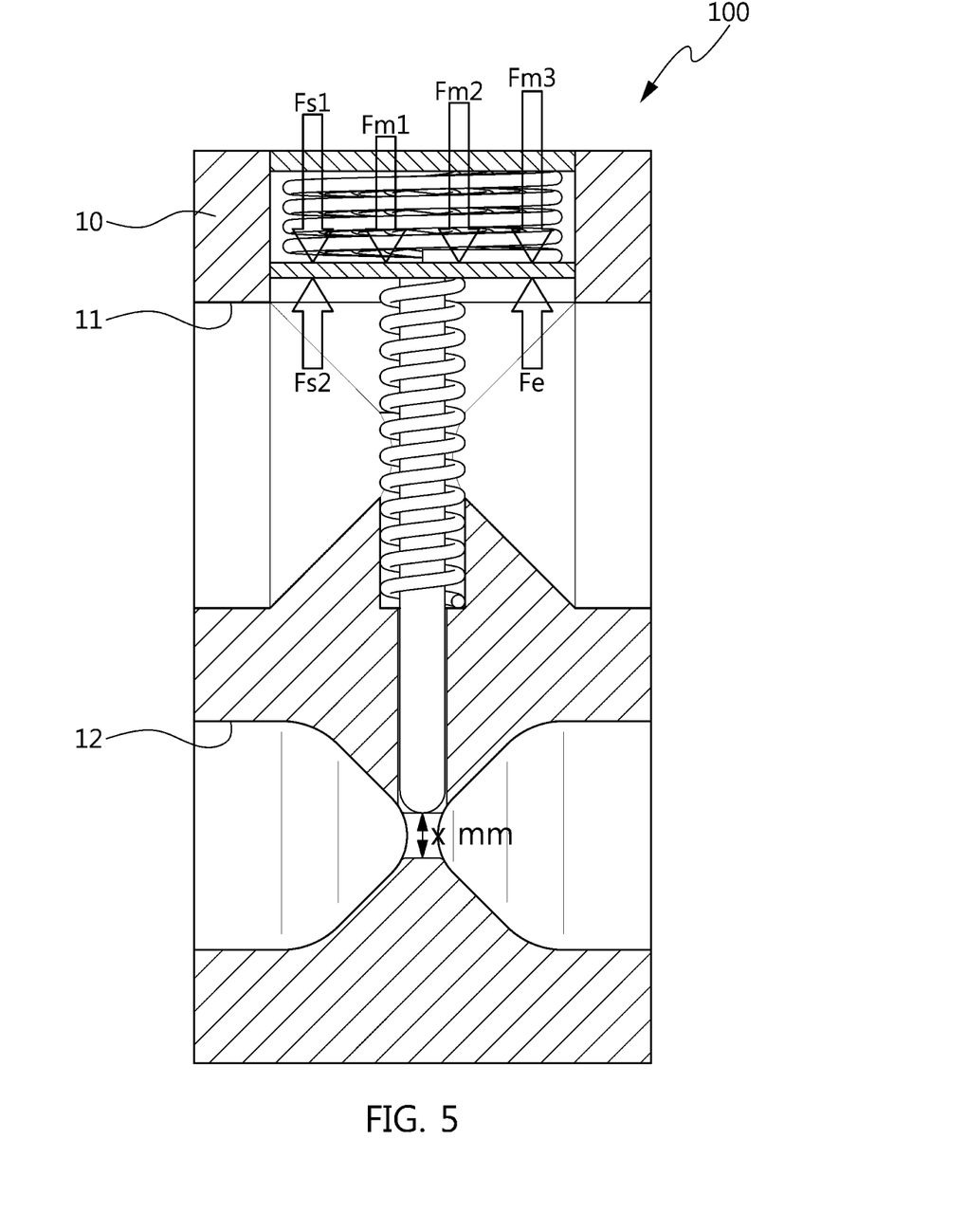
FIG. 5 is a view describing a force equilibrium state in the expansion valve shown in FIG. 2.

FIG. 5 is a view describing a force equilibrium state in the expansion valve shown in FIG. 2.

As shown in FIG. 5, according to the force equilibrium state among a force caused by the upper spring 32, a force caused by the lower spring 33 and a force of the refrigerant pressure, the lift amount of the lift shaft 31 is changed to adjust the size L of the orifice hole of the second refrigerant flow passage 12.

Here, the force caused by the upper spring 32 and the force caused by the lower spring 33 may can be expressed by a spring force according to the lift (displacement) amount (×mm) of the lift shaft 31.

First, the upper spring 32 may be expressed as resultant force of a spring force Fs1 of the typical spring 32a, a spring force Fm1 of the first shape memory alloy spring 32b and a spring force Fm2 of the second shape memory alloy spring 32c and a spring force Fm3 of the third shape memory alloy spring 32d.

Specifically, the spring force Fs1 of the typical normal spring 32a may be expressed as the product of a spring constant ks1 of the typical spring 32a and the displacement amount×mm. That is, Fs1 is ks1×x mm.

In addition, the spring force Fm1 of the first shape memory alloy spring 32b may be expressed as the product of a spring constant km1 of the first shape memory alloy spring 32b and the displacement amount x mm That is, Fm1 is km1×x mm, and the memory temperature at which the first shape memory alloy spring 32b exerts an elastic force is Ta.

Furthermore, the spring force Fm2 of the second shape memory alloy spring 32b may be expressed as the product of a spring constant km2 of the second shape memory alloy spring 32c and the displacement amount×mm. That is, Fm2 is km2×x mm, and the memory temperature at which the second shape memory alloy spring 32c exerts an elastic force is Tb.

In addition, the spring force Fm3 of the third shape memory alloy spring 32d may be expressed as the product of a spring constant km3 of the third shape memory alloy spring 3dc and the displacement amount×mm. That is, Fm3 is km3×x mm, and the memory temperature at which the third shape memory alloy spring 32d exerts an elastic force is Tc.

Next, a force caused by the lower spring 33 is a spring force Fs2 caused by the typical spring. That is, the spring force Fs2 caused by the lower spring 33 may be expressed as the product of a spring constant ks2 of the lower spring 33 and the displacement amount x mm That is, Fs2 is ks2×x mm.

Next, a force Fe caused by the refrigerant pressure may be expressed as the product of the refrigerant pressure Pe and the area A of the upper plate 31a of the lift shaft 31. That is, Fe is Pe×A.

From the above, the equilibrium state of the force exerting on the lift shaft 31 of the expansion valve 100 may be expressed by Equation 1 below. As described above, the force equilibrium state of the lift shaft 31 may be changed by the memory temperatures Ta, Tb and Tc of the first to third shape memory alloy springs 32b, 32c and 32d and the refrigerant pressure Pe. Accordingly, the expansion valve 100 may be regarded as a temperature-sensitive and pressure-sensitive type valve in which the opening/closing of the valve is controlled by the temperature and pressure of the refrigerant.

$$Fs1+Fm1+Fm2+Fm3=Fs1+Fe \qquad \text{Equation 1}$$

Figure 6:
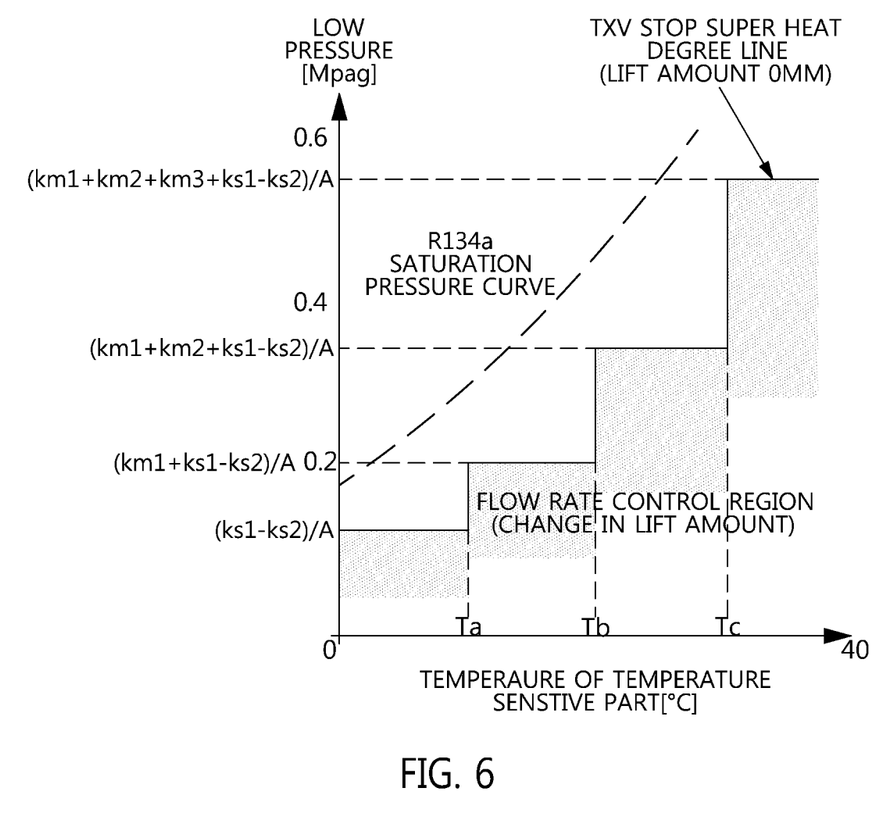
FIG. 6 is a view showing a characteristic curve of the expansion valve shown in FIG. 2.

Here, by substituting and arranging the equations of the respective forces, the refrigerant pressure Pe may be calculated as the following equation 2. The refrigerant pressure Pe is used when showing a characteristic curve of the expansion valve (TXV) shown in FIG. 6 which will be described later.

$$Pe=(km1+km2+km3+ks1-ks2)\times x/A \qquad \text{Equation 2}$$

FIG. 6 is a view showing the characteristic curve of the expansion valve shown in FIG. 2.

Referring to FIG. 6, the first to third shape memory alloy springs 32b, 32c and 32d may exert or not exert an elastic force according to the refrigerant temperature T. Here, although the case of four steps is considered as the first to third shape memory alloy springs 32b, 32c and 32d are used, the number of cases for each step in of the characteristic curves of the expansion valve is determined according to the number of shape memory alloy springs.

Specifically, when the refrigerant temperature T is lower than the memory temperature Ta of the first shape memory alloy spring 32b (i.e., T<Ta), not only the first shape memory alloy spring 32b but also the second shape memory alloy spring 32c and the third shape memory alloy spring 32d do not exert an elastic force. In this case, Pe becomes (ks1−ks2)×x/A in the above Equation 2.

Next, when the refrigerant temperature T is higher than the memory temperature Ta of the first shape memory alloy spring 32b and is lower than the memory temperature Tb of the second shape memory alloy spring 32b (i.e., Ta<T<Tb), the first shape memory alloy spring 32b exerts the elastic force, but the second shape memory alloy spring 32c and the third shape memory alloy spring 32d do not exert an elastic force. In this case, Pe becomes (km1+ks1−ks2)×x/A in the above Equation 2.

Next, when the refrigerant temperature T is higher than the memory temperature Tb of the second shape memory alloy spring 32c and is lower than the memory temperature Tc of the third shape memory alloy spring 32d (i.e., Tb<T<Tc), the first shape memory alloy spring 32b and the second shape memory alloy spring 32c exert the elastic force, but the third second shape memory alloy spring 32d does not exert an elastic force. In this case, Pe becomes (km1+km2+ks1−ks2)×x/A in the above Equation 2.

Next, when the refrigerant temperature T is higher than the memory temperature Tc of the third shape memory alloy spring 32d (i.e., Tc<T), all the first to third shape memory alloy springs 32b, 32d and 32d exert the elastic force. In this case, Pe becomes (km1+km2+km3+ks1−ks2)×x/A in the above Equation 2.

Figure 7:
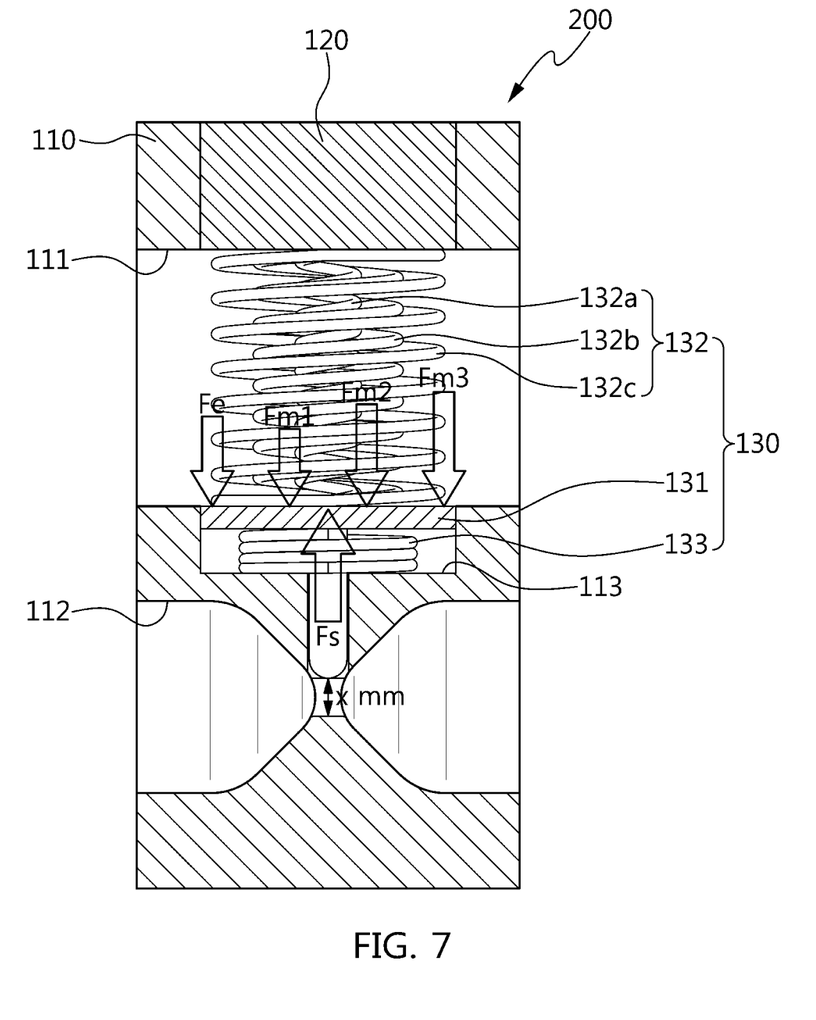
FIG. 7 is a view describing a force equilibrium state in an expansion valve employing the shape memory alloy spring, according to anther embodiment of the present disclosure.

FIG. 7 is a view describing a force equilibrium state in an expansion valve employing the shape memory alloy spring, according to anther embodiment of the present disclosure.

Like the expansion valve 100 shown in FIG. 2, an expansion valve 200 illustrated in FIG. 7 includes a valve housing 110, a valve cover 120, and an opening/closing adjuster 130.

In addition, a first refrigerant flow passage 111 and a second refrigerant flow passage 112 are formed on both sides of the valve housing 110 to pass through the both sides. Here, the first refrigerant flow passage 111 is formed on an upper portion and the second refrigerant flow passage 112 is formed on a lower portion of the valve housing.

In addition, as shown in FIG. 7, each of the first refrigerant flow passage 111 and the second refrigerant flow passage 112 has a bilateral symmetrical structure, and the second refrigerant flow passage 112 is formed in the form of a venturi tube having an orifice hole.

Although FIG. 2 shows the configuration in which the opening/closing adjuster 30 is received in the opening/closing adjuster receiving space 13 formed above the first refrigerant flow passage 11, in a configuration shown in FIG.

7, the opening/closing adjuster 130 is received in an opening/closing adjuster receiving space 113 formed below of the first refrigerant flow passage 111. Here, the opening/closing adjuster receiving space 113 has a concaved shape formed below the first refrigerant flow passage 111.

In FIG. 7, an upper spring 132 is located in the first refrigerant flow passage 111, and a lower spring 133 is located in the opening/closing adjuster receiving space 113.

In this case, the upper spring 132 is disposed between the valve cover 120 and a lift shaft 131. In other words, since the valve cover 120 is fixed to the upper spring 132, the upper spring 132 is supported by the valve cover 120 and exerts an elastic force on the lift shaft 31, so that the upper spring 132 and the lower spring 133 are maintained in a force equilibrium state.

In addition, the lower spring 133 is disposed between the lift shaft 131 and a bottom face of the opening/closing member receiving space 113. That is, since the lower spring 133 is fixed to the bottom face of the opening/closing member receiving space 113, the lower spring 133 is supported by the bottom face of the opening/closing member receiving space 113 and exerts an elastic force on the lift shaft 131, so that the lower spring 133 and the upper plate 132 are maintained in a force equilibrium state.

Specifically, according to the force equilibrium state among a force caused by the upper spring 132, a force caused by the lower spring 133 and a force of the refrigerant pressure, the lift amount of the lift shaft 131 is changed to adjust the size L of the orifice hole of the second refrigerant flow passage 112.

Here, the upper spring 132 may be expressed as a resultant force of the spring force Fm1 of a first shape memory alloy spring 132a, the spring force Fm2 of a second shape memory alloy spring 132b and the spring force Fm3 of a third shape memory alloy spring 132c. That is, the equations of force are derived as Fm1=km1×x mm, Fm2=km2×x mm, and Fm3=km3×x mm.

At this time, the upper spring 132 does not include the force caused by the typical spring as shown in FIG. 2

In addition, the force caused by the lower spring 133 is the spring force Fs caused by the typical spring. That is, the equation of force is derived as Fs=ks×x mm.

However, the force Fe caused by the refrigerant pressure does not exert in the same direction as the lower spring 133 as shown in FIG. 2, but exerts in the same direction as the upper spring 132. Here, Fe is Pe×A, wherein, Pe is the refrigerant pressure, and A is the area of the upper plate of the lift shaft 133.

From the above, the equilibrium state of the force exerting on the lift shaft 31 of the expansion valve 100 may be expressed by Equation 3 below.

$$Fm1+Fm2+Fm3+Fe=Fs \quad \text{Equation 3}$$

Here, by substituting and arranging the equations of the respective forces, the refrigerant pressure Pe may be calculated as the following Equation 4.

$$Pe=(km1+km2+km3-ks)\times x/A \quad \text{Equation 4}$$

Referring to FIGS. 2 and 7, in the opening/closing adjuster 30/130, the force equilibrium state is established between the upper spring 32/132 and the lower spring 33/133 with respect to the lift shaft 31/131.

To this end, it is possible to variously combine the shape memory alloy springs and the typical spring constituting the upper spring 32 or 132 and the lower spring 33 or 133 according to the method for installing the lift shaft 31 or 131.

In the force equilibrium state, at this time, the direction in which the force caused by the refrigerant pressure exerts should be considered.

As described above, the expansion valves 100 and 200 may be expected to have the following advantages in comparison with the existing expansion valve.

First, the expansion valves 100 and 200 can be manufactured at a low cost because the number of parts thereof can be reduced to save the cost (including the manufacturing process cost) and reduce the weight. However, since the existing expansion valve requires parts such as a spring, a shaft connected to a diaphragm, a ball valve, and the like, the number of parts is larger than that of each of the expansion valves 100 and 200. As compared with the expansion valves 100 and 200, in addition, the existing expansion valve is expensive since the considerable precision is required for manufacturing it.

Further, since it is possible to adjust the memory temperature and the spring constant of the shape memory alloy and to apply them, the expansion valves 100 and 200 of the disclosure can expect the advantage of the valve design and cost reduction. However, since the existing expansion valve needs to secure the property of active gas contained in a diaphragm, there is a restriction on a valve design.

Further, the expansion valves 100 and 200 can prevent the lift shaft from be vibrated through the structure improvement of the lift shaft (structure for connecting the upper plate and the control bar) without adding any additional part. However, since the existing expansion valve has a structure in which a fine vibration cannot be prevented due to a thin shaft, it is necessary to employ a structure (addition of a pin cover supporting a shaft position) to prevent noise generation.

Furthermore, the expansion valves 100 and 200 have a configuration in which the lift shaft directly controls the opening/closing of the orifice hole of the refrigerant flow passage (that is, the second refrigerant flow passage), and have a linear structure in which the refrigerant flow passage is not severely changed. That is, since the spring of the opening/closing adjuster is positioned above the second refrigerant flow passage, the expansion valves 100 and 200 can be manufactured to have a smooth structure so as to minimize occurrence of turbulence in the refrigerant flow passage. In the existing expansion valve, on the contrary, the refrigerant flow passage is severely changed, so that a connecting portion of the refrigerant flow passages can be easily occurred. Accordingly, it is necessary to use a distributing plate as an additional element to prevent noise from occurring. Also, since the existing expansion valve has a configuration in which a spring is placed at a lower portion and pushes a ball valve upward, an orifice hole should be inevitably formed to face in an upward direction. This configuration has a limitation that the refrigerant flow passage should be inevitably manufactured in a stair formation.

Although the present disclosure has been described with a focus on novel features of the present disclosure applied to various embodiments, one skilled in the art will understand that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. An expansion valve using having a shape memory alloy spring, comprising:
   a valve housing having a first refrigerant flow passage and a second refrigerant flow passage passing through two sides of the valve housing, wherein the valve housing further includes an opening/closing adjuster receiving space along an opened upper portion of the valve housing;
   an opening/closing adjuster including a lift shaft, wherein the opening/closing adjuster is configured to enter through the opening/closing adjuster receiving space and to adjust flow in the second refrigerant flow passage with an elastic force generated by a lower spring and an upper spring which includes the shape memory alloy spring at a memory temperature; and
   a valve cover sealing the opened upper portion of the valve housing,
   wherein each of the first and the second refrigerant flow passages has a bilateral symmetrical structure and has a venturi tube shape having an orifice hole,
   wherein the lift shaft is configured to adjust an opening/closing degree of the orifice hole of the second refrigerant flow passage, and
   wherein the lower spring is arranged around a control bar of the opening/closing adjuster.

2. The expansion valve of claim 1, wherein the opening/closing adjuster is configured to adjust an opening/closing of the orifice hole of the second refrigerant flow passage based on a refrigerant pressure and a refrigerant temperature of the first refrigerant flow passage.

3. The expansion valve of claim 2, wherein the lift shaft comprises: a disc-shaped upper plate, and
   wherein the control bar protrudes vertically and downwardly through a hole and integrally connected to a center of the upper plate, wherein a lower end of the control bar is configured to adjust a size of the orifice hole of the second refrigerant flow passage, and
   wherein the upper spring is arranged above the upper plate.

4. The expansion valve of claim 3, wherein the upper spring includes a plurality of springs having the same central axis and having different diameters, and
   wherein the plurality of springs comprise at least one shape memory alloy spring having a different temperature.

5. The expansion valve of claim 3, wherein the upper spring is arranged between the valve cover and an upper face of the upper plate.

6. The expansion valve of claim 3, wherein when the opening/closing adjuster is arranged above the first refrigerant flow passage, a spring force of the upper spring and a sum of a spring force of the lower spring and a force caused by the refrigerant pressure are maintained in a force equilibrium state.

7. The expansion valve of claim 6, wherein the upper spring is disposed in the opening/closing adjuster receiving space and the lower spring is exposed to the first refrigerant flow passage.

8. The expansion valve of claim 3, wherein when the opening/closing adjuster is arranged below the first refrigerant flow passage, a spring force of the lower spring and a sum of a spring force of the upper spring and a force caused by the refrigerant pressure are maintained in a force equilibrium state.

9. The expansion valve of claim 8, wherein the upper spring is exposed to the first refrigerant flow passage and the lower spring is disposed in the opening/closing adjuster receiving space.

10. An air conditioner system for a vehicle comprising:
    a compressor configured to compress and deliver a refrigerant;
    a condenser configured to condense to liquefy the compressed refrigerant delivered from the compressor;
    an expansion valve configured to throttle the refrigerant condensed and liquefied by the condenser; and
    an evaporator configured to heat-exchange the refrigerant, which is throttled by the expansion valve, with air blown toward an indoor of a vehicle and to evaporate, so that the air discharged to the indoor of the vehicle is cooled by latent heat of vaporization of the refrigerant,
    wherein the expansion valve comprises:
    a valve housing having a first refrigerant flow passage and a second refrigerant flow passage passing through both sides of the valve housing, wherein the valve housing further includes an opening/closing adjuster receiving space along an opened upper portion of the valve housing;
    an opening/closing adjuster including a lift shaft and configured to enter the opening/closing adjuster receiving space and to adjust flow in the second refrigerant flow passage with an elastic force generated by a lower spring and an upper spring which includes the shape memory alloy spring at a memory temperature; and
    a valve cover sealing the opened upper portion of the valve housing,
    wherein each of the first and the second refrigerant flow passages has a bilateral symmetrical structure and has a venturi tube shape having an orifice hole,
    wherein the lift shaft is configured to adjust an opening/closing degree of the orifice hole of the second refrigerant flow passage, and
    wherein the lower spring is arranged around a control bar of the opening/closing adjuster.

11. The air conditioner system of claim 10, wherein an inlet port of the first refrigerant flow passage is connected to an outlet port of the evaporator,
    an outlet port of the first refrigerant flow passage is connected to an inlet port of the compressor,
    an inlet port of the second refrigerant flow passage is connected to an outlet port of the condenser, and
    an outlet port of the second refrigerant flow passage is connected to an inlet port of the evaporator.

12. The air conditioner system of claim 10, wherein the opening/closing adjuster is configured to adjust an opening/closing of the orifice hole of the second refrigerant flow passage by a refrigerant pressure and a refrigerant temperature of the first refrigerant flow passage.

13. The air conditioner system of claim 12, wherein lift shaft comprises a disc-shaped upper plate,
    wherein the control bar protrudes vertically and downwardly through a hole and is integrally connected with the upper plate,
    wherein a lower end of the control bar is configured to adjust a size of the orifice hole of the second refrigerant flow passage, and
    wherein the upper spring is arranged above the upper plate.

14. The air conditioner system of claim 13, wherein the upper spring includes a plurality of springs having the same central axis and having different diameters, and wherein the plurality of springs comprise at least one shape memory alloy spring having a memory temperature.

15. The air conditioner system of claim 13, wherein when the opening/closing adjuster is arranged above the first refrigerant flow passage, a spring force of the upper spring and a sum of a spring force of the lower spring and a force caused by the refrigerant pressure are maintained in a force equilibrium state.

16. The air conditioner system of claim 13, wherein when the opening/closing adjuster is arranged below the first refrigerant flow passage, a spring force of the lower spring and a sum of a spring force of the upper spring and a force caused by the refrigerant pressure are maintained in a force equilibrium state.

* * * * *